Oct. 7, 1941.   L. T. SACHTLEBEN   2,258,223
MOUNTING OF CYLINDRICAL LENSES
Filed Nov. 30, 1939
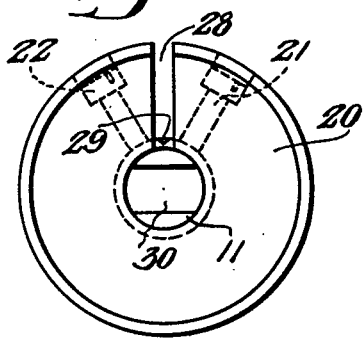
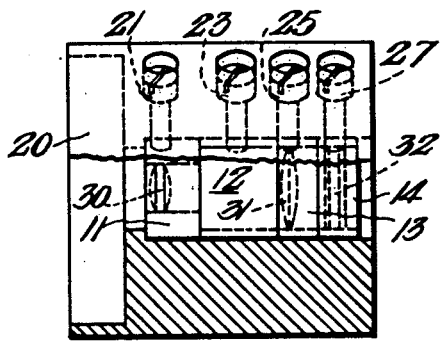
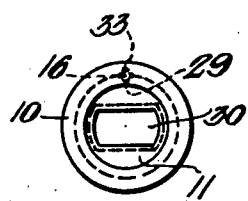
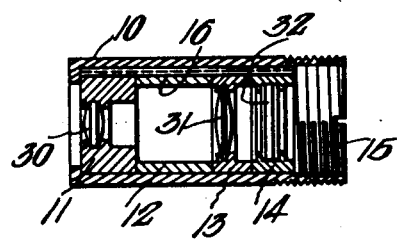
Inventor
Lawrence T. Sachtleben
By
Attorney Patented Oct. 7, 1941

2,258,223

UNITED STATES PATENT OFFICE 2,258,223

MOUNTING OF CYLINDRICAL LENSES

Lawrence T. Sachtleben, Camden, N. J., assignor to Radio Corporation of America, a corporation of Delaware Application November 30, 1939, Serial No. 306,849

7 Claims. (Cl. 88—57)

This invention relates to an improved mount for cylindrical lenses, particularly cylindrical lenses of the type used in sound recording objectives, and an improved method of fitting the lenses to the mount.

It has been customary in commerical sound recordings to use what is generally referred to as an optical slit in which a reduced image of an illuminated slit is focused upon the film on which the record is to be made. The reduction ratio may be anywhere from 4:1 to 10:1 and, in such arrangements, the usual microscope objective type of lens has been thoroughly satisfactory for producing on the sound track an image having a width of the order of 2 or 3, or more, ten-thousandths of an inch and having a length of the order of 70 one-thousandths of an inch. In addition to this type of optical system, cylindrical lens systems have also been used, but these have usually been either of the type where the cylindrical lenses were large and of fairly long focal length and, therefore, simple to mount with sufficient accuracy or of the type in which the cylindrical lens was either a simple solid rod or a semi-cylinder of small radius. The latter were ordinarily used in systems in which an extremely high degree of precision was not required and their mounting was accordingly relatively simple.

Recent developments in the sound recording field require the use of wide tracks and in some instances multiple tracks, and in order to secure satisfactory recording under these circumstances it is necessary to use an objective having cylindrical characteristics which has the same degree of precision as the microscope objectives previously used, but which has, at the same time, at least twice the field along the length of the image. This type of lens requires extreme precision in the mounting of the cylindrical lenses and it also requires a lens mount which may be readily disassembled for cleaning and reassembled with the original degree of precision.

I accomplish that result in the present invention by individually mounting the lens elements of the objective, assembling the individual mounts in exact relation in an appropriate fixture and then cutting an appropriate guide groove exactly in alignment through the mounts while in position, thus permitting their assembly into an appropriate holder in exact alignment.

One object of the invention is to provide an improved cylindrical objective lens.

Another object of the invention is to provide an improved lens mount for lenses having cylindrical characteristics.

Another object of the invention is to provide an improved method of mounting cylindrical lenses.

Another object of the invention is to provide means by which individually mounted cylindrical lenses may be readily assembled in exact relation to each other.

Other and incidental objects of the invention will be apparent to those skilled in the art from a reading of the following specification and an inspection of the accompanying drawing in which Figure 1 is an end view of an assembled objective made in accordance with my invention, Figure 2 is a vertical longitudinal section through the objective shown in Fig. 1, Figure 3 is an end view of the lens elements of the objective of Figs. 1 and 2 as assembled in the fixture used for mounting them, and Figure 4 is a vertical longitudinal section through the fixture shown in Fig. 3.

Referring first to Figs. 1 and 2, the objective unit includes the exterior tube 10 and the individual lens mounts 11 to 14, inclusive. The member 11 carries the cylindrical objective element 30, which is preferably a corrected doublet and in section across its cylindrical axis may be of approximately the same general type as a microscope objective. As shown, however, this lens may have a length two or more times its diameter, and it may be burnished or otherwise firmly secured into the mounting element 11. The member 12 is a spacing sleeve. The member 13 carries the lens 31 which, in the present instance, is shown as a simple bi-convex spherical lens. The member 14 carries the lens 32 which, in this instance, is shown as a bi-convex cylindrical lens having its axis at right angles to that of the lens 30; that is, if the axis of the lens 30 is horizontal, the axis of the lens 32 is vertical. The member 15 is a threaded sleeve which screws into the outer tube 10 and holds the mounting elements 11—14 firmly in place. As shown in Fig. 1, the elements 11—14 are grooved in one side and the interior of the tube 10 is correspondingly grooved. Into these mating grooves, there is inserted a piece of round material such as drill rod 16 which, when of the proper size to fit firmly into both grooves, holds the elements 11—14 in accurate alignment.

The grooves in the members 11—14 is provided as follows: An appropriate fixture 20 is provided. This fixture has an axial hole of the same diameter as the interior of the tube 10 into which the individual lens mounting elements may be slid. The fixture is mounted on an optical bench provided with the usual light source, object, image, screen, etc., and the mounting element 11 carrying the lens 30 is inserted into the fixture. This element 11 is placed in an appropriate position longitudinally of the fixture where it may be held by a stop and is then rotationally adjusted until the lens 30 is accurately located in a predetermined position. The mount 11 is then secured firmly in place by tightening the screws 21 and 22. The spacer 12 is then inserted firmly against the mount 11 and is similarly secured by the screw 23 and an opposing screw corresponding to the screw 22. The mount 13 with the lens 31 is then inserted and placed firmly against the spacer member 12. The accuracy of focus of the combination 30, 31 may then be checked and, if necessary, a different lens substituted at 31 or a spacer of different length substituted. The member 13 is then firmly secured in place by the screw 25 and a corresponding screw from the opposite side, and the mount 14 is inserted. The orientation of the mount 14 and its cylindrical lens 32 is then accurately adjusted in the same manner as was done with the mount 11 and its lens 30. After the lens 32 is accurately oriented, it also is secured firmly in position by the screw 27 and an opposing screw. It will be apparent that at this stage of the procedure all of the elements of the objective are secured in the fixture in their proper relative positions so that, if reassembled in the tube 10 in the same relative position, the proper alignment will be secured. The fixture 20 is then placed in a milling machine and a milling cutter so shaped as to cut a 90° V groove is run through the slot 28 in the fixture 20 and the 90° V groove 29 is cut along all of the individual elements 11, 12, 13 and 14.

As before stated, the tube 10 is provided with a groove 33 adapted to mate with the groove 29, and a small rod 16 of appropriate diameter is provided.

In assembling the objective, the rod 16 may be placed in the groove 33 and the several lens mount elements may then be slid into the tube 10 with their respective grooves 29 fitting along the rod 16. After the elements are all in the tube 10, they are necessarily in exactly the same alignment as they were when in the fixture 20, and the threaded member 15 is then screwed into the tube 10 holding the elements firmly in position.

It will be apparent that, with the foregoing arrangement, the member 15 may be removed and the various lens elements removed from the tube 10 for cleaning and replaced without any possibility of their being wrongly oriented.

Having now described my invention, I claim:

1. In combination, a plurality of cylindrical lens mounts each having a groove in the side thereof in predetermined circumferential relation to the corresponding groove in each of the other mounts, a tubular member adapted to receive said mounts and having a groove therein complementary to the grooves in said mounts, and a single member adapted to fit said complementary grooves for maintaining all of said mounts in alignment in said tube.

2. In combination, a plurality of cylindrical lens mounts each having a groove in the side thereof in predetermined circumferential relation to the corresponding groove in each of the other mounts, a tubular member adapted to receive said mounts and having a groove therein complementary to the grooves in said mounts, and a single rod member adapted to fit said complementary grooves for maintaining all of said mounts in alignment in said tube.

3. In combination, a plurality of cylindrical lens mounts each having a groove in the side thereof in predetermined circumferential relation to the corresponding groove in each of the other mounts, a tubular member adapted to receive said mounts and having a groove therein complementary to the grooves in said mounts, a single member adapted to fit said complementary grooves for maintaining all of said mounts in alignment in said tube, and means for securing said mounts in said tube.

4. In combination, a plurality of cylindrical lens mounts each having a groove in the side thereof in predetermined relation to the corresponding groove in each of the other mounts, a tubular member adapted to receive said mounts and having a groove therein complementary to the grooves in said mounts, a single rod member adapted to fit said complementary grooves for maintaining all of said mounts in alignment in said tube, and means for securing said mounts in said tube.

5. The method of mounting cylindrical lenses including mounting each of the lenses in a cylindrical supporting member, mounting the cylindrical supporting members in a temporary holding fixture, adjusting the orientation of the cylindrical axes of said lenses in proper relation to each other, cutting a single continuous groove in all of said members while the lenses are in said relation, and assembling said members with said grooves in alignment in cooperative relation with a rigid rod member.

6. The method of mounting cylindrical lenses including mounting each of the lenses in a cylindrical supporting member, mounting the cylindrical supporting members in a temporary holding fixture, adjusting the orientation of the cylindrical axes of said lenses in proper relation to each other, cutting a single continuous straight groove in all of said members while the lenses are in said relation, and assembling said members with said grooves in alignment in cooperative relation with a rigid rod member.

7. The method of mounting cylindrical lenses including mounting each of the lenses in a cylindrical supporting member, mounting the cylindrical supporting members in a temporary holding fixture, adjusting the orientation of the cylindrical axes of said lenses in proper relation to each other, cutting a single continuous groove in all of said members while the lenses are in said relation, and assembling said members in a tube with said grooves in alignment in cooperative relation with a rigid rod member, positioned in a complementary groove in the inner wall of the tube.

LAWRENCE T. SACHTLEBEN.